US008543743B2

(12) United States Patent  
Eilebrecht (10) Patent No.: US 8,543,743 B2  
(45) Date of Patent: Sep. 24, 2013

(54) LOCK FREE QUEUE

(75) Inventor: Eric L. Eilebrecht, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1277 days.

(21) Appl. No.: 12/360,301

(22) Filed: Jan. 27, 2009

(65) Prior Publication Data

US 2010/0192161 A1 Jul. 29, 2010

(51) Int. Cl.  
*G06F 3/00* (2006.01)  
*G06F 5/00* (2006.01)

(52) U.S. Cl.  
USPC .......................................................... 710/52

(58) Field of Classification Search  
None  
See application file for complete search history.

(56) References Cited

U.S. PATENT DOCUMENTS

| | | | |
|---|---|---|---|
| 5,301,192 A | 4/1994 | Henrion | |
| 6,032,207 A * | 2/2000 | Wilson | 710/54 |
| 6,487,202 B1 * | 11/2002 | Klausmeier et al. | 370/395.1 |
| 6,754,795 B2 | 6/2004 | Chen et al. | |
| 7,299,242 B2 | 11/2007 | Moir et al. | |
| 7,484,017 B1 * | 1/2009 | Young | 710/52 |
| 2002/0116568 A1 | 8/2002 | Oksanen | |
| 2004/0015510 A1 | 1/2004 | Moir et al. | |
| 2005/0204103 A1 * | 9/2005 | Dennison | 711/154 |
| 2006/0031839 A1 * | 2/2006 | Kang | 718/102 |
| 2007/0079071 A1 * | 4/2007 | Saha et al. | 711/118 |
| 2007/0157200 A1 | 7/2007 | Hopkins | |
| 2007/0157214 A1 | 7/2007 | Martin et al. | |
| 2008/0112423 A1 | 5/2008 | Christenson | |
| 2009/0133023 A1 * | 5/2009 | Li et al. | 718/102 |

OTHER PUBLICATIONS

Hakan Sundell and Philippas Tsigas, Principles of Distributed Systems, 2005, pp. 240-255, Springer Berlin Heidelberg, Lock-Free and Practical Doubly Linked List-Based Deques Using Single-Word Compare-and-Swap, http://link.springer.com/chapter/10.1007%2F11516798_18?LI=true.*  
University of Toronto, Faculty of Arts and Sciences; Answers to Apr.-May 2005 Examinations of CSC 148H1 S, 148H5 S, and A48H3 S; Apr.-May 2005; p. 2; http://www.cs.toronto.edu/~hojjat/148s07/tests/PastExams/2005 1ans.pdf.*  
Ladan-Mozes, et al., "An Optimistic Approach to Lock-Free FIFO Queues", retrieved at <<http://www.cs.tau.ac.il/~shanir/nir-pubs-web/Papers/FIFO_Queues.pdf>>, pp. 15.  
Ladan-Mozes, et al., "Correction of a Memory Management Method for Lock-Free Data Structures", retrieved at <<http://ftp.cs.rochester.edu/u/scott/papers/1995_TR599.pdf>>, pp. 1-7.  
Giacomoni, et al., "FastForward for Efficient Pipeline Parallelism", retrieved at <<http://delivery.acm.org/10.1145/1350000/1345215/p43-giacomoni.pdf?key1=1345215&key2=2766867221&coll=GUIDE&dl=GUIDE&CFID=12287505&CFTOKEN=36836533>>, PPoPP'08, Feb. 20-23, 2008, Salt Lake City, Utah, USA, pp. 43-52.

(Continued)

*Primary Examiner* — Kris Rhu  
(74) *Attorney, Agent, or Firm* — Rau Patents, LLC (57) ABSTRACT

A first in, first out queue uses a sequence of arrays to store elements in the queue. The arrays are constructed using a lock free queue, and within each array, a lock free mechanism may be used to enqueue and dequeue elements. Many embodiments may use atomic operations to ensure successful placement of elements in the queue, as well as remove elements from the queue. The atomic operations may be used within a loop until successful.

20 Claims, 4 Drawing Sheets

(56) References Cited

OTHER PUBLICATIONS

Cong, et al., "Lock-Free Parallel Algorithms: An Experimental Study", retrieved at <<http://www.springerlink.com/content/xw2v4a7h74j8ykhp/fulltext.pdf>>, HiPC 2004, LNCS 3296, 2004, pp. 516-527.

Groves, Lindsay, "Trace-based Derivation of a Lock-Free Queue Algorithm", retrieved at <<http://www.sciencedirect.com/science?_ob=ArticleURL&_udi=B75H1-4S0RXT9-5&_user=3765386&_rdoc=1&_fmt=&_orig=search&_sort=d&view=c&_acct=C000060897&_version=1&_urlVersion=0&_userid=3765386&md5=cdd9926e2967a30816a1c5ed8e364965>>, Electronic Notes in Theoretical Computer Science 201 (2008), pp. 69-98.

Groves, Lindsay, "Verifying Michael and Scott's Lock-Free Queue Algorithm using Trace Reduction", retrieved at <<http://crpit.com/confpapers/CRPITV77Groves.pdf>>, Fourteenth Computing: The Australasian Theory Symposium (CATS2008),Wollongong, Australia. Conferences in Research and Practice in Information Technology (CRPIT), vol. 77, 2008, pp. 10.

* cited by examiner

LOCK FREE QUEUE

BACKGROUND

Queues are mechanisms for buffing and storing information, and are used widely within computer science. One example is a work queue that may be accessed by multiple processes or threads. Such a queue may be a first in, first out (FIFO) queue where multiple producer threads may place items in the queue and multiple consumer threads may retrieve items to process.

Some queues employ locks to ensure that one and only one process may enqueue or dequeue at a time. Locking queues can lead to a blocking condition where the queue does not become unlocked if the process that is enqueuing or dequeuing does not finish properly and leaves the queue in a locked state.

SUMMARY

A first in, first out queue uses a sequence of arrays to store elements in the queue. The arrays are constructed using a lock free queue, and within each array, a lock free mechanism may be used to enqueue and dequeue elements. Many embodiments may use atomic operations to ensure successful placement of elements in the queue, as well as remove elements from the queue. The atomic operations may be used within a loop until successful.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A first in, first out queue uses a linked list of arrays to store items in the queue. The items in the queue are stored in individual elements in the arrays. As the queue grows, additional arrays may be created and added to the list, and as the arrays are emptied, the arrays may be removed from the linked list. When an array has empty elements, items may be added to the array without changing the linked list.

The queue may use various atomic operations and looping to ensure that contentions for the queue are properly resolved. Multiple processes that attempt to enqueue items at the same time will have their items added without interfering with each other, and items that are being dequeued will go to one and only one receiving process.

Throughout this specification and claims, a first in, first out queue is discussed. New items are added to the tail of the queue, and the oldest items are removed from the head of the queue. The terms 'head' and 'tail' are used throughout the specification and claims to refer to the ends of the queue or directions along the queue from which items are removed and added, respectively.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
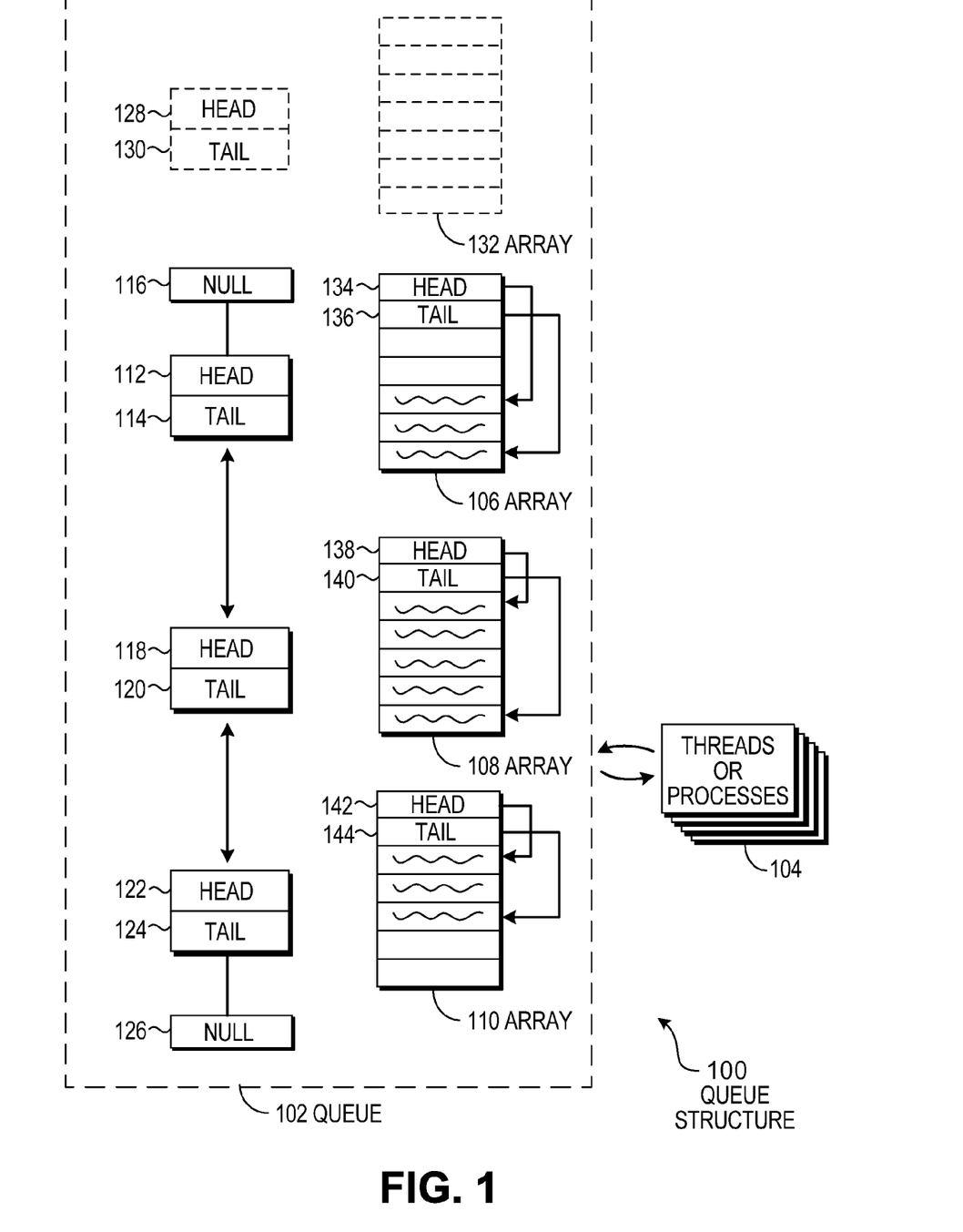
FIG. 1 is a diagram illustration of an embodiment showing a queue structure that may have a series of arrays in which queued elements are stored.

FIG. 1 is a diagram of an embodiment 100 showing a queue system that may be used by multiple threads or processes. Embodiment 100 is a simplified example of the components and memory objects that may make up a queue.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is a schematic representation of a queue system. A queue 102 may be made up of a set of linked arrays, and each array may contain several elements. The data stored in the queue may be stored in the array elements.

The queue 102 may be accessed by multiple threads or processes 104. The threads or processes 104 may access the queue 102 in parallel and may contend for access. The queue 102 may use certain atomic operations, such as Compare And Swap (CAS) or other operations to ensure that one and only one thread or process may add an element to the queue or remove an element from the queue.

Figure 3:
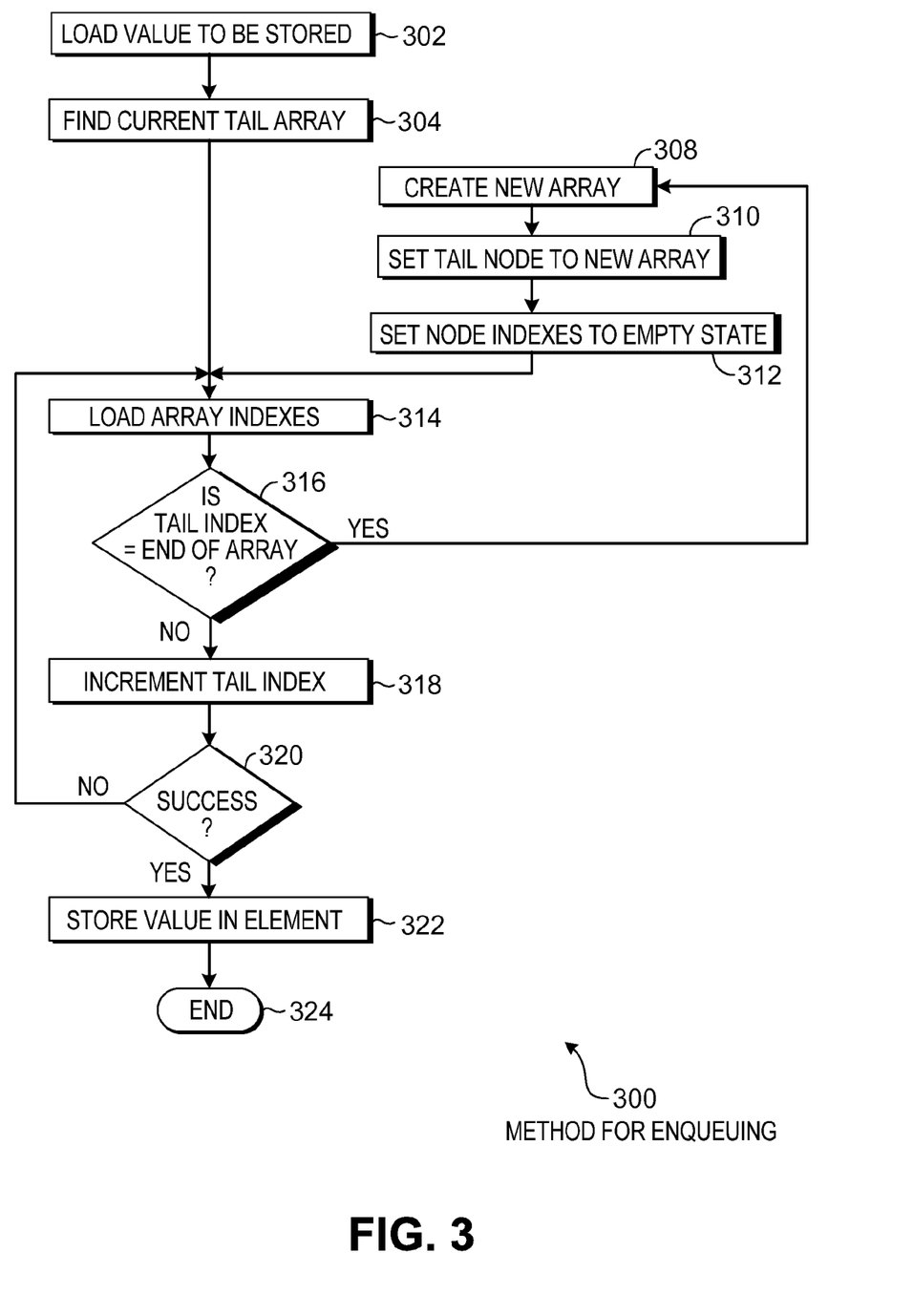
FIG. 3 is a flowchart illustration of an embodiment showing a method for enqueuing items to a queue.
Figure 4:
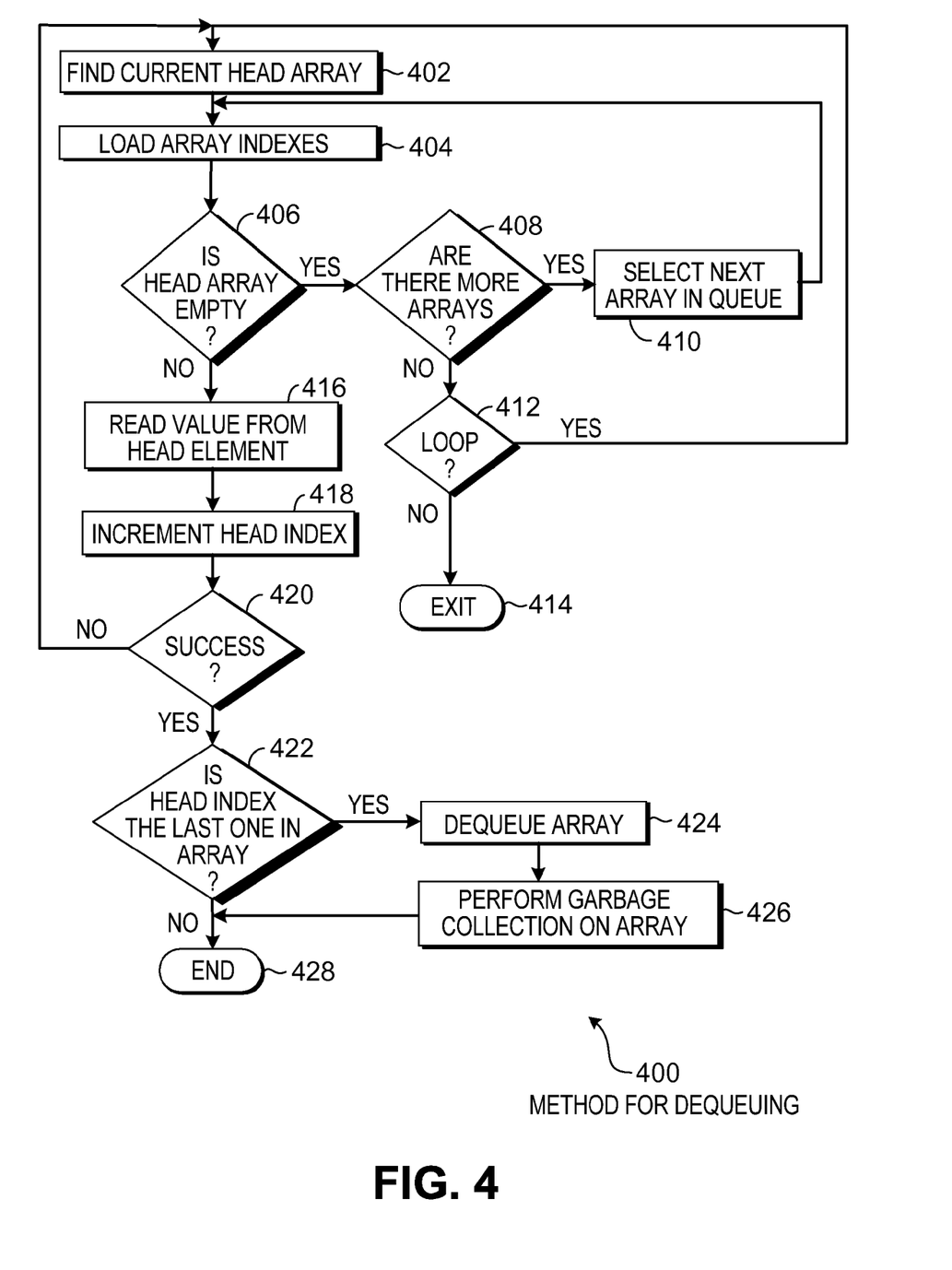
FIG. 4 is a flowchart illustration of an embodiment showing a method for dequeuing items from a queue.

The enqueuing process is described in embodiment 300 presented later in this specification. The dequeuing process is described in embodiment 400 presented later in this specification.

The queue 102 may be used for any type of buffering, work queuing, or other uses for a first in, first out queue. In one embodiment, the queue 102 may be used for managing pools of threads, for example. In a thread pool, groups of threads are created to process a large number of tasks. Many of the threads may be executed in parallel and, in some cases, significant performance improvements may be experienced.

The queue 102 may be used for buffering when one or more producer processes create work items that are processed by one or more consumer processes. The producer processes may create work items in parallel and may store work items in the queue 102 by enqueuing items into the tail of the queue. The queue 102 may accept work items from the producer processes at random intervals.

In the example, the consumer processes may pull a work item from the queue 102 whenever the consumer processes are available to process the work item. When the consumer processes are busy, the queue 102 may grow with work items. When the consumer processes are available, the consumer processes may remove items from the head of the queue. In the example, the queue 102 may transfer the work items from the producer processes to the consumer processes, and may maintain the sequence of a first in, first out order of the work items.

The queue 102 may have several safeguards that may ensure that each element is properly accepted into the queue and that the element is properly released from the queue. In order to accept an element into the queue, one and only one element may be placed in the queue at a time. Contention between different producer threads or other element suppliers may be resolved by using various atomic operations to perform certain steps in the enqueuing sequence, and looping when the atomic operations fail. Similarly, atomic operations and loops may be used in the dequeuing sequence to ensure that each item is transferred to one and only one consumer thread or other receiver of the element.

The queue 102 may be constructed from several linked arrays 106, 108, and 110. The arrays may contain elements in which individual items are stored. The elements contain the data stored in the queue 102. In many configurations, the elements may contain pointers to data or other objects.

The linked arrays 106, 108, and 110 may contain several elements. In some embodiments, the arrays may contain 4, 8, 16, or more elements. Some embodiments may have arrays that contain thousands of elements. The number of elements in an array may be different in various embodiments.

The performance of the queue 102 may vary with the size of the elements and the number of elements in an array. For arrays with small sized elements, a higher number of elements may be used. In some cases, larger sized elements may be used with smaller sized arrays.

The size of the arrays may depend on the hardware and software systems on which the queue 102 operates. In some hardware configurations, an optimum array size may correspond to the structure of a physical memory component. In some software configurations, an optimum array size may correspond to an operating system limitation, an addressing scheme, a memory management system capability, or other software component particularity.

The architecture of the queue 102 is a linked list of arrays. In general, the processing cost of enqueuing and dequeuing elements from an array may be very low compared to the processing cost of adding and removing arrays. This may be especially true in systems where garbage collection is used, since the removal of an element from an array does not invoke garbage collection, but the removal of an array does invoke garbage collection. In systems where many elements are processed by garbage collection routines, overall performance of the system may decline when the overhead process of garbage collection has to process large numbers of elements.

The arrays 106, 108, and 110 are linked together using head and tail pointers. Array 106 has a head pointer 112 and tail pointer 114. Since array 106 is currently at the head of the queue, the head pointer 112 points to null 116.

In many embodiments, the null 116 may be used to indicate that an array is currently the head array. Other embodiments may use a different indicator technique. The current head array may be the array from which items may be removed during a dequeue operation. When the head array is emptied by repeated dequeuing operations, the next array in sequence may become the new head array and the next items in sequence may be removed from the new head array.

When the head array is emptied, the head array may be removed from the linked list and discarded. In many embodiments, a garbage collection operation may return the memory allocated to the old head array to a memory pool. The array 132 may be an example of an old head array that has been emptied, along with a head pointer 128 and tail pointer 130. Once the array 132 was emptied, the array 132 became an old head array and array 106 became a new head array.

The head array 106 has a tail pointer 114 that points to a head pointer 118 for array 108. Similarly, array 108 has a tail pointer 120 that points to a head pointer 122 for array 110. The various head and tail pointers may link the various arrays together and allow a queue management system to traverse the queue.

The array 110 may be the tail array for the queue 102. In a similar fashion to the head array 106, the tail pointer 124 of the tail array 110 may point to null 126. Other embodiments may use a different technique for indicating a tail array.

When the queue 102 is initially formed, the queue 102 may start with a single array that may be empty. The single array may have a head and tail pointer that each point to null. After the initial array is populated, another array may be added to the tail and the tail pointer of the first array may be updated to point to the head pointer of the second array. The process may continue adding arrays as more and more items are enqueued.

Similarly, as items are removed from a queue and the arrays are emptied, the arrays may be removed from the linked list and discarded. As arrays are removed from the linked list, the head pointer of the new head array is changed to null. This process may occur over and over until only one array is left in the queue. When the only array left in the queue is emptied of items, the queue itself may be empty and the head pointer and tail pointer for the array are both pointing to null.

Within each array, a head index and tail index may point to elements within the array. For example, the head array 106 has a head index 134 and a tail index 136. The head index 134 may point to the head element in the array 106. Since the array 106 is the head array in the queue 102, the head index 134 points to the head element in the overall queue 102. The array 108 may have a head index 138 and a tail index 140. The tail array 110 may have a head index 142 and a tail index 144.

The head index in the head array points to the head element in the queue. When a dequeue operation occurs, the head index is incremented to point to the next element in sequence and the contents of the head element are transferred to the requesting process. When the head index reaches the tail index of the array, the head index is pointing to the last element in the array. When the last element in the array is dequeued, the next array becomes the head array and the old head array is discarded.

Similarly, a tail index points to the last item in an array. In the case of a tail array 108, the tail index 144 points to an element in the middle of the tail array 108. When an item is enqueued, the item may be placed in the next element in the tail array 108 and the tail index may be incremented. When the tail index reaches the end of the tail array, a new tail array may be created and linked to the old tail array. A subsequent enqueuing operation may add the next item to the first element of the new tail array.

Different embodiments may use different mechanisms for pointing or indicating head elements and tail elements in an array. Some embodiments may use the head index and tail index to point to the next available element within the array. In such a case, the indexes may point to an open or unused element. Other embodiments may use the head index and tail index to point to the last element populated in the array. Such an embodiment may have indexes that point to current elements as opposed to open or unused elements. Various embodiments may use different pointing conventions as part of a programming convention, personal style, language restrictions, or other reasons. The examples described within this specification are merely examples of one manner for employing a queue system and are not meant to be limiting.

Figure 2:
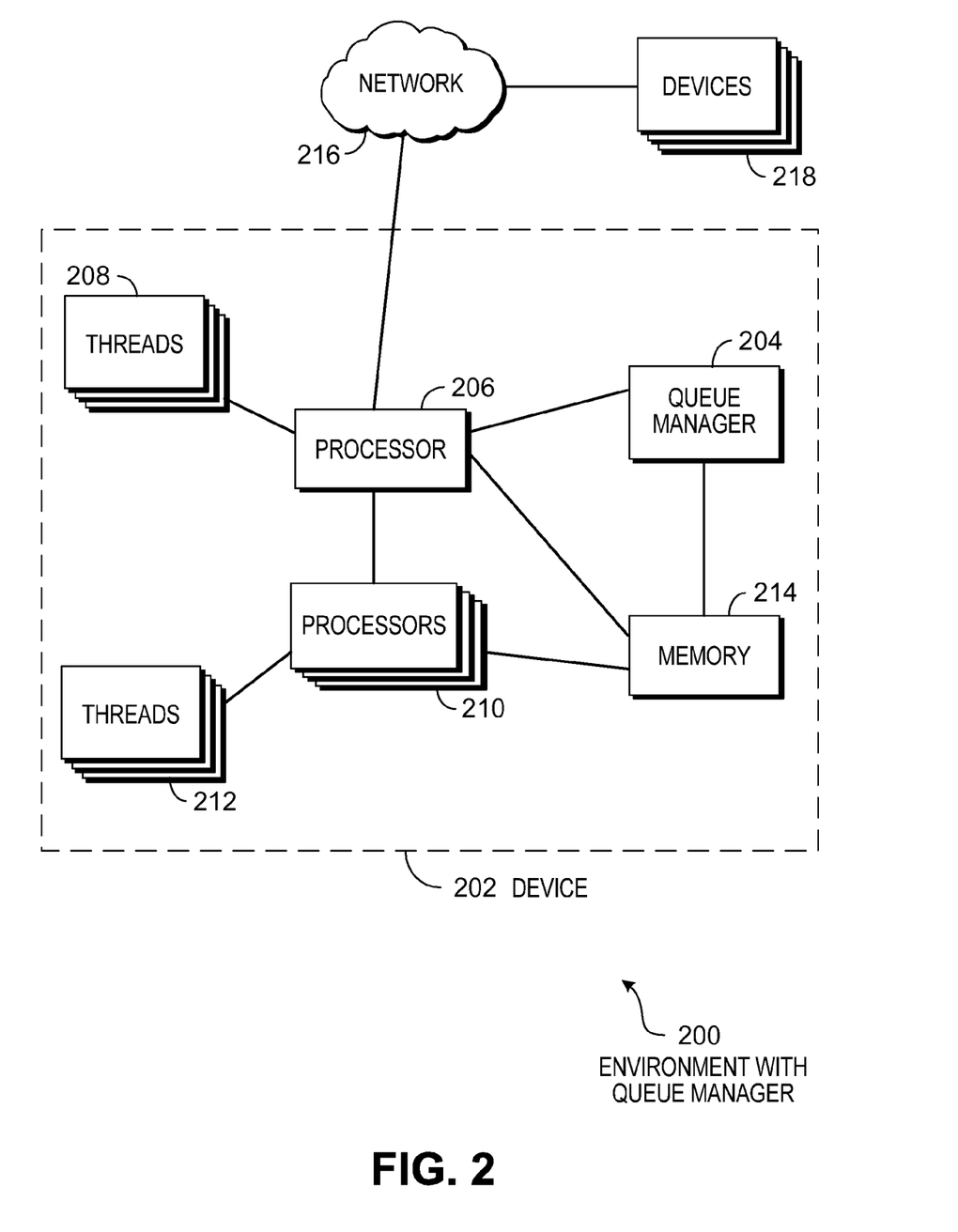
FIG. 2 is a diagram illustration of an embodiment showing an environment in which a queue manager may operate.

FIG. 2 is a diagram of an embodiment 200 showing an environment in which a queue system may be used. Embodiment 200 is a simplified example of merely one use for the queue system described in embodiment 100.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 200 on which a queue manager 204 may operate. The queue manager 204 may be a hardware device, such as a field programmable gate array (FPGA), application specific integrated circuit (ASIC), peripheral device, or some other hardware implementation of the functionality described for the queue 102 in embodiment 100. In some implementations, the queue manager 204 may be a software program that is executed by a processor 206. In such an implementation, the processor 206 may perform the functions of the queue 102 in embodiment 100. In some embodiments, the functionality of the queue manager 204 may be incorporated into a central processing unit for a general purpose or special purpose microprocessor.

The device 202 may be any type of computer device, such as a personal computer or a server computer. Other embodiments may be a laptop computer, handheld mobile phone, personal digital assistant, handheld scanner, or other device. In some cases, the device 202 may be an industrial controller device used to control or manage industrial machinery, a central processing device for an automobile, or other controller device.

The queue manager 204 may accept enqueue and dequeue requests from threads 208 that may operate on the processor 206. In such an embodiment, the processor 206 may operate in a multitasking mode and may perform the queue manager 204 operations in parallel with those operations of the threads 208.

The queue manager 204 may allocate, store, retrieve, and perform other data storage operations with memory 214. In many cases, the memory 214 may be random access memory and may be used by the queue manager 204 as well as the threads 208.

Some embodiments may have several processors 210 on which several threads 212 may be operating. Such an embodiment may have multiple processor cores or multiple individual processors, each of which may have multiple threads operating that interact with the queue manager 204.

In a many embodiments, many different threads and processors may send enqueue and dequeue requests to the queue manager 204. In such cases, the various threads may attempt to access the queue simultaneously. The queue manager 204 may have be capable of atomic operations that may ensure that each element is properly added and removed from the queue without losing and element or without duplicating an element. Example methods for such operations are described in embodiments 300 and 400 later in this specification.

In some embodiments, the device 202 may be connected to a network 216 and thereby to other devices 218. In such embodiments, the queue manager 204 may be configured to receive and process enqueue and dequeue requests from the other devices.

For example, the device 202 may be a network routing device that may receive packets of information to transmit and enqueue those packets. The packets may be received from devices 218 through the network 216. A receiving device 218 may pull the packets of information from the queue when the receiving device is ready to accept the packets.

In another embodiment, the device 202 may have an operating system that is capable of parallel processing. Within the operating system, several worker threads 208 may be created to process general purpose commands or units of work for the operating system. Other threads may place units of work into a queue that may be managed by the queue manager 204. The worker threads may dequeue units of work and process the work as the threads become free. In some such embodiments, the queue manager 204 may be part of an operating system and may be used within the device 202.

FIG. 3 is a flowchart illustration of an embodiment 300 showing a method for enqueuing an element in a queue. Embodiment 300 is a simplified example of an embodiment for adding elements to the tail of a queue having the architecture of queue 102 in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is an example of an enqueuing method that may be used with a queue similar to the queue 102 of embodiment 100. The method of embodiment 300 may add an element to a tail array of the queue. If the tail array is full, a new tail array may be created and added to the queue.

The embodiment 300 attempts to increment the tail index of the array. If the incrementing is successful, the data may be stored in the array. If the incrementing is unsuccessful, a new tail index may be attempted by looping back and re-attempting the process. In many embodiments, the incrementing operation may be an atomic operation, meaning that the operation is completed in a single processing cycle by the queue manager or the processor on which the queue manager is executing. Because the operation is atomic, a successful operation may ensure that the current attempt to enqueue a data value is the only operation that may store data in the array element. When the operation is unsuccessful, another thread may be attempting to perform an enqueue operation at the same time and the operation is retried.

Embodiment 300 is one example of a method for performing an enqueue operation using the structure of queue 102. Other embodiments may perform similar operations or may have different steps or different mechanisms for ensuring proper operation of the queue 102. For example, different sets of atomic operations and different sequences of operations may be used to ensure data integrity of the queue.

In a typical embodiment, multiple threads may be attempting to perform the operations of embodiment 300. The threads may be operating in parallel and may be simultaneously attempting to enqueue and dequeue items to and from the queue.

The value to be stored may be loaded in block 302.

The current tail array is identified in block 304 and the array indexes are loaded in block 314. If the tail index is at the end of the array in block 316, a new array may be created in block 308.

When the tail index is at the end of the array in block 316, the tail index indicates that the current tail array is full. A new tail array may be created in block 308 and the tail pointer of the current array may be set to point to the new tail array in block 310. The node indexes of the new array may be set to an empty state in block 312. When a new tail array may created in block 308, the head pointer and tail pointer for the new tail array may be set to the old tail array and null, respectively. After creating the new array and setting the various indices, the process may return to block 314 and re-read the array indexes.

In many embodiments, the operations of blocks 316, 308, 310, and 312 may be performed in an atomic fashion.

If the tail index is not equal to the end of the array in block 316, the tail index may be incremented in block 318. If the incrementing operation of block 318 is successful in block, 320, the value is stored in the element in block 322. If the incrementing operation of block 320 is not successful in block 320, the process may return to block 314 to attempt the process again with new array indexes.

By looping through the blocks 314-320, the process of embodiment 300 may continue to try to store the value in the queue until successful. The failure in block 320 may be the result of another thread attempting an enqueue operation while the current thread is performing the operations of blocks 314 and 316.

In many embodiments, the operation of incrementing the tail index in block 318 may be an atomic operation. An example of an atomic operation that may perform the function of block 318 is a Compare And Swap (CAS) operation. Other embodiments may use different atomic operations or may configure the process differently to utilize CAS or other atomic operations for the functions of block 318-322.

FIG. 4 is a flowchart illustration of an embodiment 400 showing a method for dequeuing an element in a queue. Embodiment 400 is a simplified example of a method for adding elements to the head of a queue having the architecture of the queue 102 in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is one example of a method for performing a dequeue operation using the structure of queue 102. Other embodiments may perform similar operations or may have different steps or different mechanisms for ensuring proper operation of the queue 102. For example, different sets of atomic operations and different sequences of operations may be used to ensure data integrity of the queue.

In a typical embodiment, multiple threads may be attempting to perform the operations of embodiment 400. The threads may be operating in parallel and may be simultaneously attempting to enqueue and dequeue items to and from the queue.

The current head array may be located in block 402 and the array indexes may be loaded in block 404. If the head array is empty in block 406, and there are more arrays in block 408, the next array may be selected in the queue in block 410.

The head array may be empty when another thread performing a process similar to embodiment 400 has removed the last element from the array but has not yet completed the operation of dequeuing the array, as described in block 424 later in this specification. Thus, when the head array is empty, the dequeuing operation may go to the next array in the queue in block 410. The next array may be found by traversing the head and tail pointers associated with the arrays, such as the head and tail pointers 112 and 114 associated with array 106 in embodiment 100.

If there are not more arrays in block 408, the queue may be empty. In some embodiments, the dequeuing operation may attempt to loop in block 412 and may return to block 402 for another attempt at dequeuing. If the loop is not performed in block 412, the process may exit in block 414.

If the head array is not empty in block 406, the value from the head element may be read in block 416 and, the head index may be incremented in block 418.

The operation of incrementing the head index in block 418 may be an atomic operation. Some embodiments may use a CAS operation as part of the operation of block 418.

If the incrementing is not successful in block 420, the process may return to block 402 for another attempt at dequeuing. The incrementing operation may be unsuccessful when another thread has performed the incrementing operation while the present process is performing the operations of block 404, 408, and 416.

When block 418 is performed as an atomic operation, the process or thread that performs the incrementing operation of block 418 is the process or thread that may use the value from the head element retrieved in block 416. When a process or thread retrieves the value from the head element in block 416 but is unsuccessful in incrementing the head index in block 418, that process or thread may discard the value and seek a new value from another attempt.

The process of looping from block 420 to block 402 is a mechanism to ensure that competing dequeuing operations each properly retrieve one and only one element, and that each dequeued element goes to one and only one dequeuing process.

If the head index is the last one in the array in block 422, the array may be deemed empty, and the array may be dequeued in block 424. After dequeuing the array in block 424, garbage collection may be performed on the array in block 426 and the process may end in block 428.

If the head index is not the last one in the array in block 422, the process may end in block 428.

The process of dequeuing the array in block 424 may involve setting the new head array's head pointer to null believe The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method executed by at least one processor comprising:
   identifying a queue comprising a sequence of arrays, each of said arrays having a head pointer, a tail pointer, a head index, and a tail index;
   in each of said arrays, said head pointer containing a pointer to one of said arrays ahead of said array, except when said array is a head array, said head pointer contains null;
   in each of said arrays, said tail pointer containing a pointer to one of said arrays behind said array, except when said array is a tail array, said tail pointer contains null;
   said head index being a pointer to a head element within said array;
   said tail index being a pointer to a tail element within said array;
   determining that said head array is a first of said sequence of arrays;
   determining that said head index in said head array is pointing to an element within said head array;
   retrieving said element from said head array;
   attempting to change said head index to point to a next element in said head array;
   failing to change said head index;
   retrieving a new head index; and
   attempting to change said new head index to point to said next element in said head array.

2. The method of claim 1, said attempting to change said head index being comprised in an atomic operation.

3. The method of claim 1 wherein said attempting to change said new head index to point to said next element in said head array is successful.

4. The method of claim 1 wherein said steps of retrieving and attempting are performed within a loop until successful.

5. The method of claim 4, said loop further comprising:
   determining that said new head index is not within said head array;
   identifying a new head array being one of said arrays pointed to by said head pointer for said head array;
   setting said head array as old head array; and
   setting said new head array as said head array.

6. The method of claim 5, said loop further comprising setting said head pointer of said new head array to null.

7. The method of claim 5, said loop further comprising:
   performing garbage collection on said old head array.

8. The method of claim 1, said method being performed by a plurality of different processes against said queue.

9. A method executed by at least one processor comprising:
   identifying a queue comprising a sequence of arrays, each of said arrays having a head pointer, a tail pointer, a head index, and a tail index;
   in each of said arrays, said head pointer containing a pointer to one of said arrays ahead of said array, except when said array is a head array, said head pointer contains null;
   in each of said arrays, said tail pointer containing a pointer to one of said arrays behind said array, except when said array is a tail array, said tail pointer contains null;
   said head index being a pointer to a head element within said array;
   said tail index being a pointer to a tail element within said array;
   receiving data to store in said queue;
   determining that said tail array is a last of said sequence of arrays;
   determining that said tail index in said tail array is pointing to an element within said tail array;
   attempting to change said tail index to point to a next element in said tail array;
   failing when attempting to change said tail index;
   retrieving a new tail index;
   attempting to change said new tail index to point to said next element in said tail array; and
   storing said data in said next element from said tail array.

10. The method of claim 9, said changing said tail index being comprised in an atomic operation.

11. The method of claim 9 wherein the step of attempting to change said new tail index to point to said tail element in said tail array was successful.

12. The method of claim 9 wherein said steps of retrieving and attempting are performed in a loop until successful.

13. The method of claim 12, said loop further comprising:
    determining that said new tail index is not within said tail array;
    creating a new tail array;

setting said tail pointer for said tail array to said new tail array; and setting new tail array as said tail array.

14. The method of claim 13, said loop further comprising setting said tail pointer of said new tail array to null.

15. The method of claim 13, said setting said tail pointer being an atomic operation.

16. The method of claim 9 being performed by a plurality of processes.

17. A method executed by at least one processor comprising:
- identifying a queue comprising a sequence of arrays, each of said arrays having a head pointer, a tail pointer, a head index, and a tail index;
  - in each of said arrays, said head pointer containing a pointer to one of said arrays ahead of said array, except when said array is a head array, said head pointer contains null;
  - in each of said arrays, said tail pointer containing a pointer to one of said arrays behind said array, except when said array is a tail array, said tail pointer contains null;
  - said head index being a pointer to a head element within said array;
  - said tail index being a pointer to a tail element within said array;
- receiving data to store in said queue;
- determining that said tail array is a last array of said sequence of arrays;
- determining that said tail index in said tail array is pointing to an element within said tail array;
- attempting to change said tail index to point to a next element in said tail array;
- storing said data in said next element in said tail array from said tail array;
- determining that said head array is a first array of said sequence of arrays;
- determining that said head index in said head array is pointing to an element within said head array;
- retrieving said element in said head array from said head array, said element comprising said data; and
- attempting to change said head index to point to a next element in said head array; and
- wherein when either attempting to change said tail index or attempting to change said head index fails further;
- retrieving a new head index or new tail index;
- attempting to change said new head index to point to said next element in said head array when said change said head index fails; and
- attempting to change said new tail index to point to said next element in said tail array when said change said tail index fails.

18. The method of claim 17, said changing said tail index being an atomic operation.

19. The method of claim 17, said changing said head index being an atomic operation.

20. The method of claim 17, said data being received by a first process and said element being transferred to a second process.

* * * * *